United States Patent
Ke

(10) Patent No.: US 10,379,777 B2
(45) Date of Patent: Aug. 13, 2019

(54) METHOD FOR PERFORMING REPLICATION CONTROL IN STORAGE SYSTEM WITH AID OF RELATIONSHIP TREE WITHIN DATABASE, AND ASSOCIATED APPARATUS

(71) Applicant: Synology Incorporated, Taipei (TW)

(72) Inventor: Kun-Cing Ke, Taipei (TW)

(73) Assignee: SYNOLOGY INCORPORATED, Taipei (TW)

(*) Notice: Subject to any disclaimer, the term of this patent is extended or adjusted under 35 U.S.C. 154(b) by 178 days.

(21) Appl. No.: 15/627,404

(22) Filed: Jun. 19, 2017

(65) Prior Publication Data

US 2018/0364912 A1 Dec. 20, 2018

(51) Int. Cl.
*G06F 3/06* (2006.01)
*G06F 16/22* (2019.01)
*G06F 16/27* (2019.01)

(52) U.S. Cl.
CPC .............. *G06F 3/065* (2013.01); *G06F 3/061* (2013.01); *G06F 3/067* (2013.01); *G06F 3/0619* (2013.01); *G06F 16/2246* (2019.01); *G06F 16/27* (2019.01)

(58) Field of Classification Search
None
See application file for complete search history.

(56) References Cited

U.S. PATENT DOCUMENTS

| 7,404,051 | B2* | 7/2008 | Shitomi | G06F 11/1662 711/162 |
| 7,567,991 | B2* | 7/2009 | Armangau | G06F 11/1435 |
| 2010/0082921 | A1* | 4/2010 | Thompson | G06F 11/2071 711/162 |
| 2015/0066857 | A1* | 3/2015 | Dayal | G06F 16/128 707/639 |
| 2017/0249222 | A1* | 8/2017 | Patnaik | G06F 3/0619 |
| 2017/0300247 | A1* | 10/2017 | Dewey | G06F 3/0619 |

* cited by examiner

*Primary Examiner* — Michael Alsip
(74) *Attorney, Agent, or Firm* — McClure, Qualey & Rodack, LLP

(57) ABSTRACT

A method for performing replication control in a storage system and an associated apparatus are provided. The method may include: recording relationships between a protection target in a first storage server and a plurality of snapshots of the protection target in a database of the first storage server and updating the database during recording the relationships; selecting a non-replicated snapshot that has not been replicated from the first storage server to a second storage server; selecting a replicated snapshot that has been replicated from the first storage server to the second storage server as reference of replication difference calculation according to a relationship tree within the database; generating snapshot difference data between the non-replicated snapshot and the replicated snapshot; and transmitting the snapshot difference data from the first storage server to the second storage server, to replicate the non-replicated snapshot from the first storage server to the second storage server.

19 Claims, 14 Drawing Sheets

METHOD FOR PERFORMING REPLICATION CONTROL IN STORAGE SYSTEM WITH AID OF RELATIONSHIP TREE WITHIN DATABASE, AND ASSOCIATED APPARATUS

BACKGROUND OF THE INVENTION

1. Field of the Invention

The present invention relates to storage management, and more particularly, to a method for performing replication control in a storage system, and an associated apparatus.

2. Description of the Related Art

For a storage system that is capable of performing replication, when there is a restore event, some problems may occur. For example, the storage system may automatically perform unnecessary data transmission for replication, and the high bandwidth usage in a network may degrade the overall performance of the storage system. In another example, the storage system may automatically transmit unnecessary data for replication, and the associated storage space available for further replication may decrease rapidly. Thus, a novel method and associated architecture are required for enhancing the overall performance of the storage system.

SUMMARY OF THE INVENTION

One of the objects of the present invention is to provide a method for performing replication control in a storage system, and an associated apparatus, to solve the problems which exist in the related arts.

Another of the objects of the present invention is to provide a method for performing replication control in a storage system, and an associated apparatus, to guarantee the overall performance of the storage system.

According to at least one embodiment of the present invention, a method for performing replication control in a storage system is provided. The storage system may include a first storage server and a second storage server. The method may include: recording relationships between a protection target in the first storage server and a plurality of snapshots of the protection target in a database of the first storage server and updating the database during recording the relationships, wherein the database comprises a relationship tree, and data structure of the relationship tree comprises snapshot nodes respectively corresponding to the plurality of snapshots and a protection target node corresponding to the protection target; selecting a non-replicated snapshot that has not been replicated from the first storage server to the second storage server, wherein the plurality of snapshots comprises the non-replicated snapshot, and the non-replicated snapshot is created in the first storage server at a first time point; selecting a replicated snapshot that has been replicated from the first storage server to the second storage server as reference of replication difference calculation according to the relationship tree within the database, wherein the plurality of snapshots comprises the replicated snapshot, and the replicated snapshot is created in the first storage server at a second time point prior to the first time point; generating snapshot difference data between the non-replicated snapshot and the replicated snapshot, wherein the snapshot difference data indicate any difference between the non-replicated snapshot and the replicated snapshot; and transmitting the snapshot difference data from the first storage server to the second storage server, to replicate the non-replicated snapshot from the first storage server to the second storage server.

According to at least one embodiment of the present invention, an apparatus for performing replication control in a storage system is provided. The storage system may include a first storage server and a second storage server. The apparatus may include a processing circuit that is positioned in the first storage server. The processing circuit may be arranged to control operations of the first storage server, and controlling the operations of the first storage server may include: recording relationships between a protection target in the first storage server and a plurality of snapshots of the protection target in a database of the first storage server and updating the database during recording the relationships, wherein the database comprises a relationship tree, and data structure of the relationship tree comprises snapshot nodes respectively corresponding to the plurality of snapshots and a protection target node corresponding to the protection target; selecting a non-replicated snapshot that has not been replicated from the first storage server to the second storage server, wherein the plurality of snapshots comprises the non-replicated snapshot, and the non-replicated snapshot is created in the first storage server at a first time point; selecting a replicated snapshot that has been replicated from the first storage server to the second storage server as reference of replication difference calculation according to the relationship tree within the database, wherein the plurality of snapshots comprises the replicated snapshot, and the replicated snapshot is created in the first storage server at a second time point prior to the first time point; generating snapshot difference data between the non-replicated snapshot and the replicated snapshot, wherein the snapshot difference data indicate any difference between the non-replicated snapshot and the replicated snapshot; and transmitting the snapshot difference data from the first storage server to the second storage server, to replicate the non-replicated snapshot from the first storage server to the second storage server.

The method and associated apparatus of the present invention may solve problems existing in the related arts without introducing unwanted side effects, or in a way that is less likely to introduce a side effect. In addition, the method and associated apparatus of the present invention can properly select a snapshot as reference of replication difference calculation according to the relationship tree within the database, to reduce bandwidth consumption and save the storage space of the storage system (more particularly, the storage space of the second storage server). Additionally, the method and associated apparatus of the present invention can monitor at least one user behavior of a user of the first storage server to update the data structure of the relationship tree according to the aforementioned at least one user behavior, to guarantee the overall performance of the storage system.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method for performing replication control in a storage system, and provide an associated apparatus. The storage system may include a first storage server (e.g. a source storage server, such as a server utilized as a source of replication) and a second storage server (e.g. a destination storage server, such as a server utilized as a destination of replication). Based on the method, the apparatus may control the storage system to properly replicate at least one snapshot (e.g. one or more snapshots) from the first storage server to the second storage server without introducing the related art problems.

Figure 1:
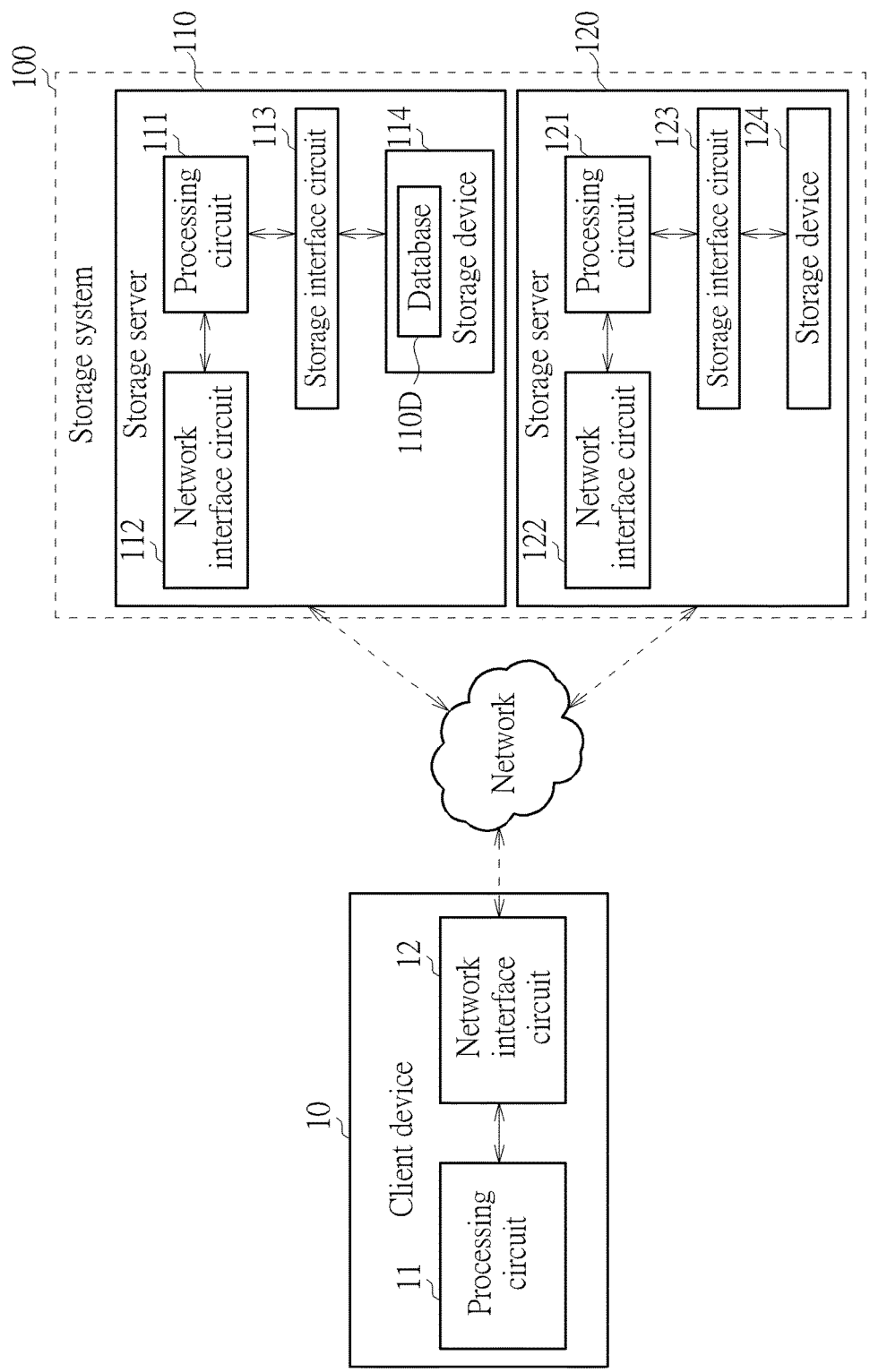
FIG. 1 is a diagram of a storage system according to an embodiment of the present invention.

FIG. 1 is a diagram of a storage system 100 according to an embodiment of the present invention. The storage system 100 may be taken as an example of the aforementioned storage system. As shown in FIG. 1, the storage system 100 may include storage servers 110 and 120, which may be taken as examples of the first storage server (e.g. the source storage server) and the second storage server (e.g. the destination storage server), respectively. The storage server 110 may include a processing circuit 111 (e.g. at least one processor, and associated circuits such as a chipset, a random access memory (RAM), etc.), a network interface circuit 112, a storage interface circuit 113, and at least one storage device (e.g. one or more storage devices, such as hard disk drives (HDDs) and/or solid state drives (SSDs)) which may be collectively referred to as the storage device 114, and the storage device 114 may include a database 110D. One or more program modules may run on the processing circuit 111 (more particularly, the processor thereof) to control operations of the storage server 110, for example, according to the method. In addition, the storage server 120 may include a processing circuit 121 (e.g. at least one processor, and associated circuits such as a chipset, a RAM, etc.), a network interface circuit 122, a storage interface circuit 123, and at least one storage device (e.g. one or more storage devices, such as HDDs and/or SSDs) which may be collectively referred to as the storage device 124. One or more program modules may run on the processing circuit 121 (more particularly, the processor thereof) to control operations of the storage server 120. Additionally, a user of the storage system 100 may access the storage system 100 through a client device 10, and the client device 10 may include a processing circuit 11 (e.g. at least one processor, and associated circuits such as a chipset, a RAM, etc.) and a network interface circuit 12. The client device 10 and the storage servers 110 and 120 may be coupled to each other through at least one network, in which wired and/or wireless network connections may be utilized.

According to this embodiment, both of the storage servers 110 and 120 may be implemented as network attached storage (NAS) devices, and the client device 10 may be any of a multifunctional mobile phone, a laptop computer, a tablet, etc. For example, the user may access at least one active storage server within the storage system 100 (e.g. one or both of the storage servers 110 and 120) after logging in to the active storage server through a browser running on the processing circuit 11 (more particularly, the processor thereof). In addition, the apparatus may include at least one portion (e.g. a portion or all) of the aforementioned storage system such as the storage system 100. For example, the apparatus may include a portion of the storage server 110, and more particularly, may include the processing circuit 111. In another example, the apparatus may include the whole of the storage server 110. In another example, the apparatus may include the whole of the storage system 100.

Figure 2:
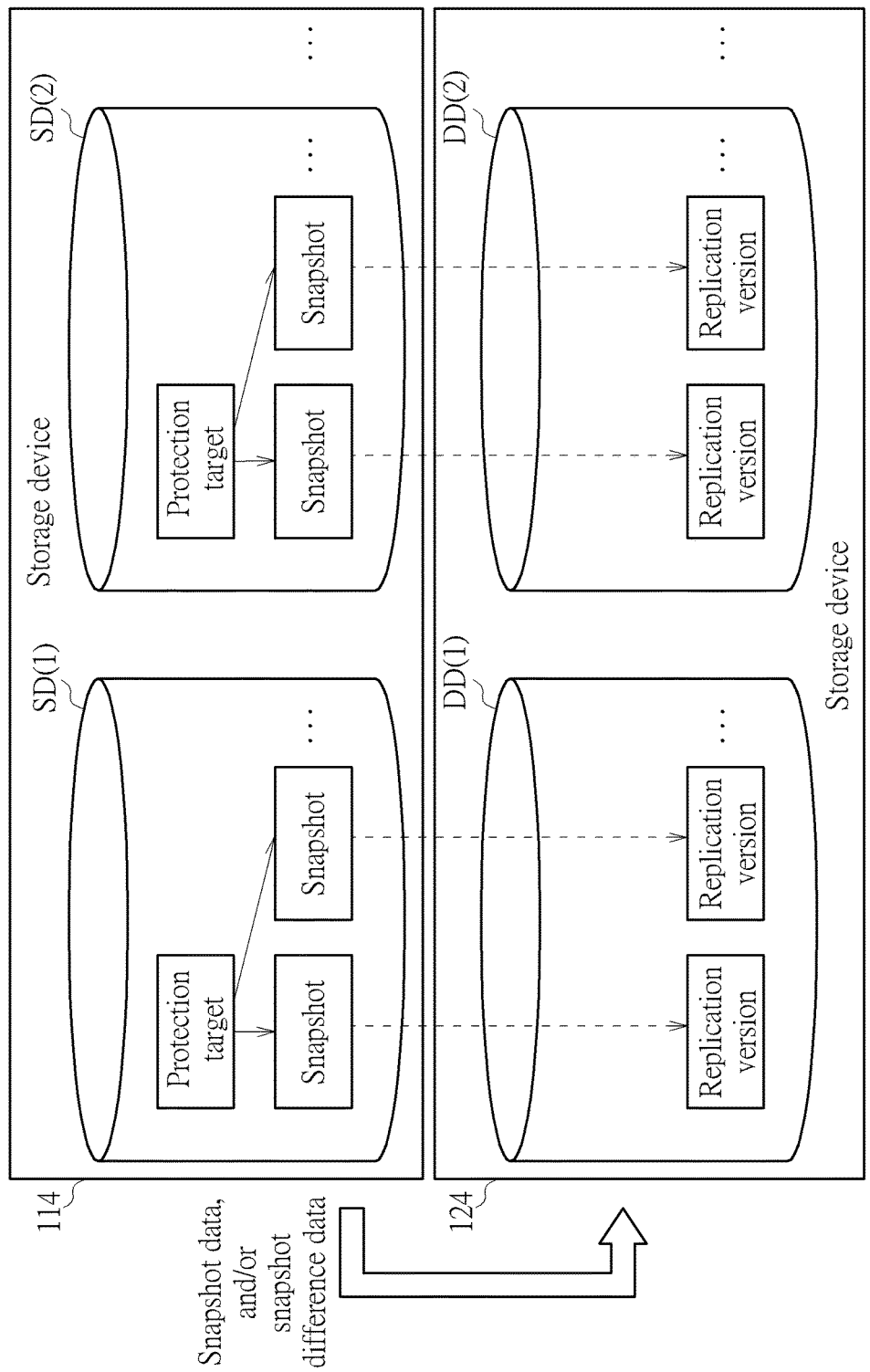
FIG. 2 illustrates some replication operations of the storage system shown in FIG. 1 according to an embodiment of the present invention.

FIG. 2 illustrates some replication operations of the storage system 100 shown in FIG. 1 according to an embodiment of the present invention. The storage devices SD(1), SD(2), etc. (e.g. HDDs and/or SSDs) may be taken as examples of the aforementioned at least one storage device within the storage device 114 shown in FIG. 1, and the storage devices DD(1), DD(2), etc. (e.g. HDDs and/or SSDs) may be taken as examples of the aforementioned at least one storage device within the storage device 124 shown in FIG. 1. Under control of the processing circuit 111, the storage server 110 may allow the user to assign some objects in the file system of the storage server 110 as protection targets, respectively. Examples of any of the objects may include, but are not limited to: a folder, a directory, a file, etc. The processing circuit 111 may control the storage server 110 to generate snapshots of a specific protection target (e.g. any of the protection targets) with respect to time, and allow the user to restore to any snapshot within the snapshots (e.g. a snapshot corresponding to a specific time point). In addition, the processing circuit 111 may control the storage server 110 to trigger replication operations related to the snapshots of the specific protection target, to replicate the snapshots to the storage server 120. As a result, the storage server 110 may transmit snapshot data and/or snapshot difference data to the storage server 120, and the processing circuit 121 may generate replication versions of the snapshots in the storage server 120. As a copy of the object which has been assigned as the specific protection by the user may exist in the storage server 120, and as there are the replication versions of the snapshots in the storage server 120, the storage server 120 may be utilized as a replacement or backup device of the storage server 110 when needed. For example, in a situation where the storage server 110 malfunctions or is damaged, the user may access the storage server 120, rather than the storage server 110. In this situation, the replication versions in the storage server 120 may be regarded as snapshots of the aforementioned copy of the object (i.e. the copy in the storage server 120), so the copy of the object may be protected by the replication versions in the storage server 120. For better comprehension, some examples of the protection targets and the associated snapshots are illustrated in the upper half of FIG. 2, and some examples of the associated replication versions are illustrated in the lower half of FIG. 2.

According to some embodiments, the snapshots may be generated in at least one Btrfs region of the storage device 114 (e.g. Btrfs regions in the storage devices SD(1), SD(2), etc., respectively), and the replication versions may be generated in at least one Btrfs region of the storage device 124 (e.g. Btrfs regions in the DD(1), DD(2), etc., respectively), but the present invention is not limited thereto.

Figure 3:
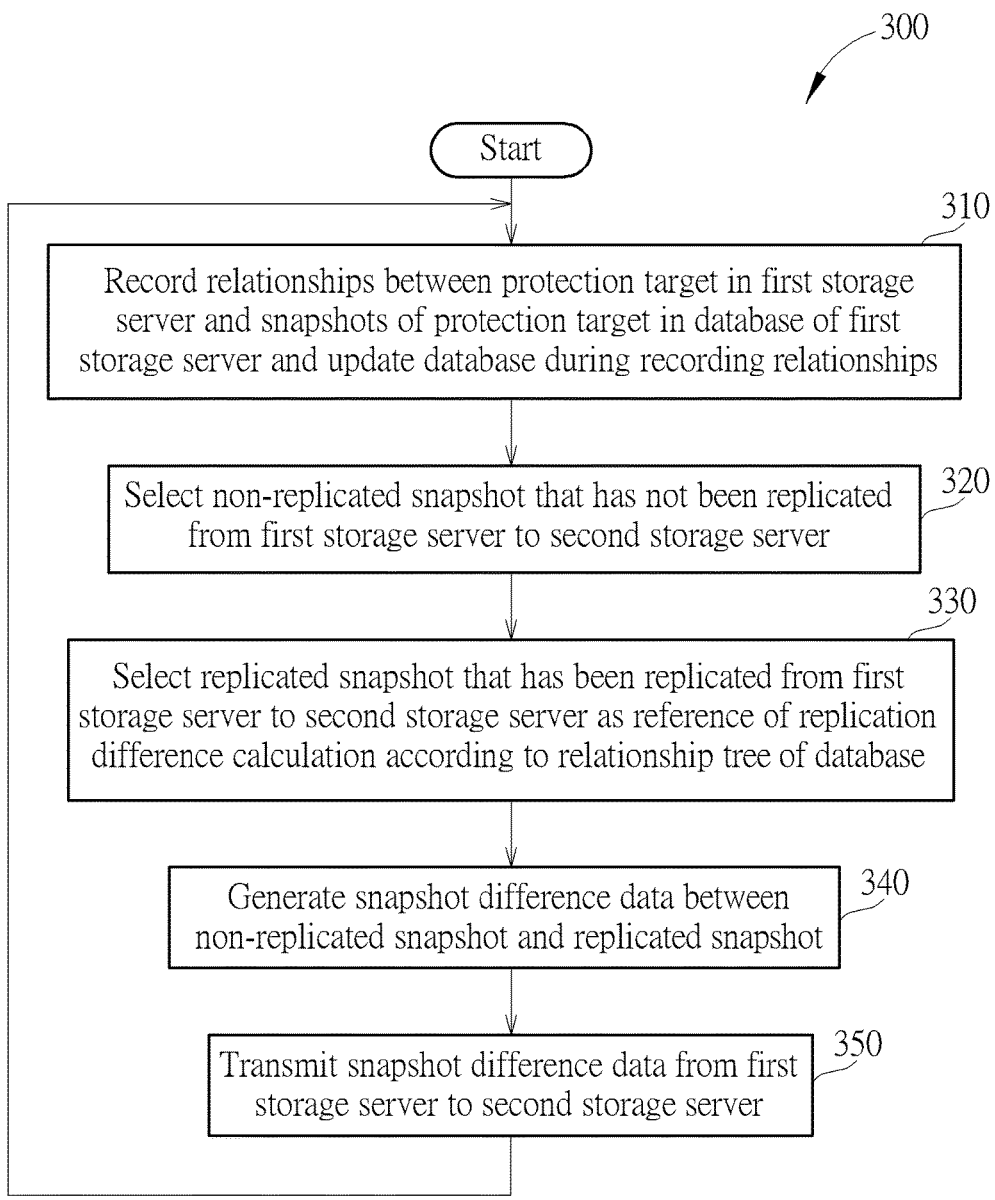
FIG. 3 is a flowchart of a method for performing replication control in a storage system according to an embodiment of the present invention.

FIG. 3 is a flowchart of a method 300 for performing replication control in a storage system according to an embodiment of the present invention. The method 300 may be taken as an example of the method mentioned above. The method 300 may be applied to the storage system 100, and may be applied to the storage server 110 and the processing circuit 111 therein. For better comprehension, in Step 310 through to Step 350, the first storage server (e.g. the source storage server) and the second storage server (e.g. the destination storage server) may be described as the storage servers 110 and 120, respectively.

In Step 310, the processing circuit 111 may record relationships between a protection target (e.g. the specific protection target) in the storage server 110 and a plurality of snapshots of the protection target in the database 110D of the storage server 110 and update the database 110D during recording the relationships. For example, the database 110D may include a relationship tree, and the data structure of the relationship tree may include snapshot nodes respectively corresponding to the plurality of snapshots and a protection target node corresponding to the protection target.

According to this embodiment, the protection target node may be a leaf node, and may be a child node of one of other nodes in the data structure of the relationship tree. One of the snapshot nodes may be set as an uppermost node in the data structure of the relationship tree, and therefore may be regarded as a root node. The processing circuit 111 may update the data structure of the relationship tree within the database 110D during recording the relationships, but the present invention is not limited thereto.

In Step 320, the processing circuit 111 may select a non-replicated snapshot that has not been replicated from the storage server 110 to the storage server 120. For example, the plurality of snapshots may include the non-replicated snapshot, and the non-replicated snapshot may be created in the storage server 110 at a first time point.

In Step 330, the processing circuit 111 may select a replicated snapshot that has been replicated from the storage server 110 to the storage server 120 as reference of replication difference calculation according to the relationship tree within the database 110D. For example, the plurality of snapshots may include the replicated snapshot, and the replicated snapshot may be created in the storage server 110 at a second time point prior to the first time point.

In Step 340, the processing circuit 111 may generate snapshot difference data between the non-replicated snapshot and the replicated snapshot. For example, the snapshot difference data may indicate any difference between the non-replicated snapshot and the replicated snapshot. In another example, in a situation where there is no difference between the non-replicated snapshot and the replicated snapshot, the snapshot difference data may indicate that no difference between the non-replicated snapshot and the replicated snapshot exists.

In Step 350, the processing circuit 111 may transmit the snapshot difference data from the storage server 110 to the storage server 120, to replicate the non-replicated snapshot from the storage server 110 to the storage server 120.

According to this embodiment, after the operation of Step 350 is performed, Step 310 may be entered to allow similar operations of Step 310 through to Step 350 to be performed with regard to the latest replicated/non-replicated statuses of the snapshots, but the present invention is not limited thereto. Regarding the latest replicated/non-replicated statuses of the snapshots, as the number of snapshots in the storage server 110 may increase as time goes by, there may be a latest non-replicated snapshot, which may be regarded as the non-replicated snapshot mentioned above during performing the similar operations of Step 310 through to Step 350.

Figure 4:
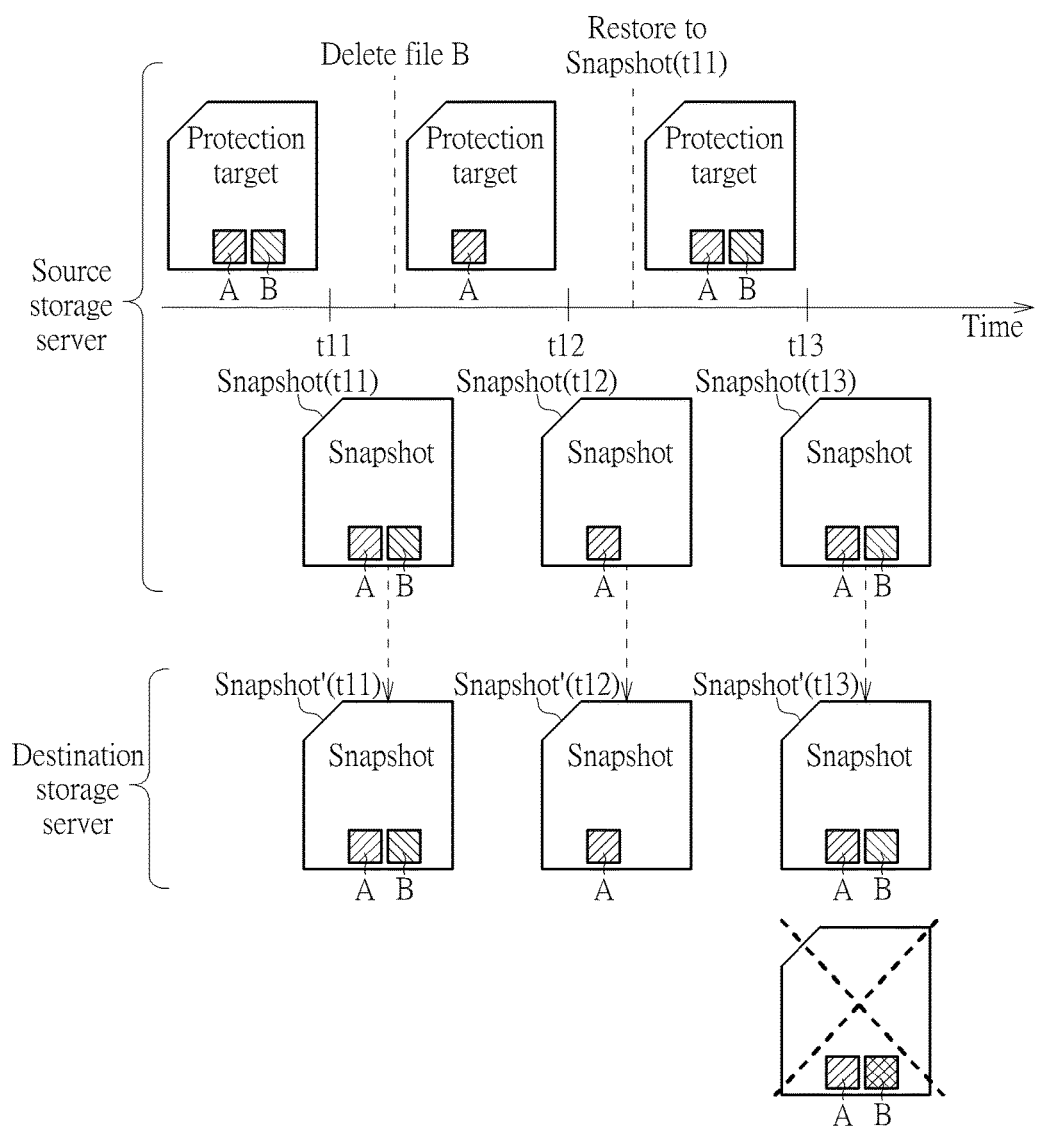
FIG. 4 illustrates some snapshots and corresponding replication versions in the storage system shown in FIG. 1 according to an embodiment of the present invention.

FIG. 4 illustrates some snapshots and corresponding replication versions in the storage system 100 shown in FIG. 1 according to an embodiment of the present invention. For example, the protection target may be a folder (e.g. a shared folder), and may originally include files A and B therein before the time point t11. The snapshots Snapshot(t11), Snapshot(t12), and Snapshot(t13) may be generated at the time points t11, t12, and t13, respectively. As the protection target originally includes the files A and B before the time point t11, the snapshot Snapshot(t11) may also include the files A and B. At an intermediate time point in the time interval [t11, t12], the user may delete the file B in the protection target, so the snapshot Snapshot(t12) may include the file A, rather than the file B. At an intermediate time point in the time interval [t12, t13], the user may trigger a restore operation to restore to the snapshot Snapshot(t11), so the snapshot Snapshot(t13) may include the files A and B.

According to the method 300, the processing circuit 111 may update the data structure of the relationship tree within the database 110D in response to operations of changing the protection target, such as the operation of deleting the file B and the operation of restoring to the snapshot Snapshot(t11). For example, the snapshots Snapshot'(t11), Snapshot'(t12), and Snapshot'(t13) in the storage server 120 may be the replication versions of the snapshots Snapshot(t11), Snapshot(t12), and Snapshot(t13) in the storage server 110, respectively. Based on the database 110D (more particularly, the data structure of the relationship tree therein), the processing circuit 111 may determine that the file B in the snapshot Snapshot(t13) and the file B in the snapshot Snapshot(t11) are the same file. As a result, in a situation where the snapshot Snapshot(t13) is selected as the non-replicated snapshot mentioned in Step 320, the processing circuit 111 may select the snapshot Snapshot(t11) (rather than the snapshot Snapshot(t12)) as the reference of replication difference calculation mentioned in Step 330. Therefore, when replicating the snapshot Snapshot(t13) from the storage server 110 to the storage server 120, the processing circuit 111 does not need to transmit the file content data of the file B, since the processing circuit 111 knows that the file B in the snapshot Snapshot(t13) and the file B in the snapshot Snapshot(t11) are the same file. The X-shape notation depicted with dashed lines may indicate that the processing circuit 111 will not treat the file B in the snapshot Snapshot(t13) and the file B in the snapshot Snapshot(t11) as different files (which may be illustrated with different types/ styles of shading patterns), and that a full backup of the file B will not occur when replicating the snapshot Snapshot (t13) from the storage server 110 to the storage server 120 is performed for generating the snapshot Snapshot'(t13). Therefore, the present invention method (e.g. the method 300) and the associated apparatus (e.g. the storage server 110 or the processing circuit 111 therein) can prevent the related art problems.

According to some embodiments (e.g. any of the embodiments respectively shown in FIG. 5, FIG. 11 and FIG. 12), the processing circuit 111 may monitor at least one user behavior of a user of the storage server 110 (e.g. the user of the storage system 100) to update the data structure of the relationship tree according to the aforementioned at least one user behavior. Examples of the user behavior may include, but are not limited to: a cloning operation triggered by the user of the storage server 110. In addition, the data structure of the relationship tree may further include another protection target node, and the other protection target node may indicate another protection target (e.g. a protection target TB) that is generated by performing the cloning operation in the storage server 110.

Figure 5:
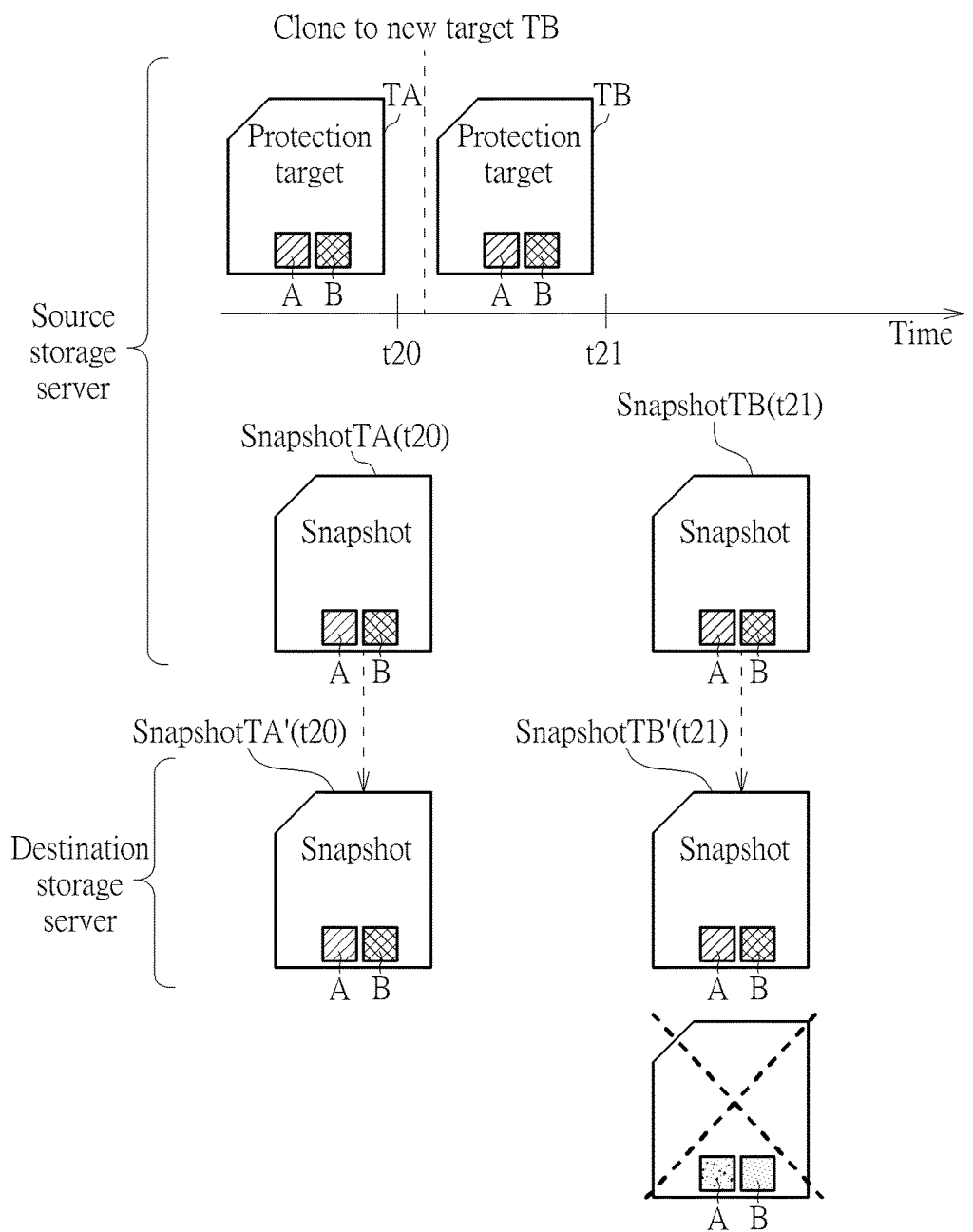
FIG. 5 illustrates some snapshots and corresponding replication versions in the storage system shown in FIG. 1 according to another embodiment of the present invention.

FIG. 5 illustrates some snapshots and corresponding replication versions in the storage system 100 shown in FIG. 1 according to another embodiment of the present invention. For example, the protection target TA may be a folder (e.g. a shared folder), and may originally include the files A and B therein before the time point t20. The user may trigger the cloning operation to clone the protection target TA to the protection target TB (labeled "Clone to new target TB" in FIG. 5, for brevity). The snapshot SnapshotTA(t20) of the protection target TA and the snapshot SnapshotTB(t21) of the protection target TB may be generated at the time points t20 and t21, respectively. As the protection target TA originally includes the files A and B before the time point t20, the snapshot SnapshotTA(t20) may also include the files A and B. At an intermediate time point in the time interval [t20, t21], the user may trigger the cloning operation, so the snapshot SnapshotTB(t21) may include the files A and B.

According to the method 300, the processing circuit 111 may update the data structure of the relationship tree within the database 110D in response to the cloning operation. For example, the snapshots SnapshotTA'(t20) and SnapshotTB' (t21) in the storage server 120 may be the replication versions of the snapshots SnapshotTA(t20) and SnapshotTB (t21) in the storage server 110, respectively. Based on the database 110D (more particularly, the data structure of the relationship tree therein), the processing circuit 111 may determine that the file A in the snapshot SnapshotTB(t21) and the file A in the snapshot SnapshotTA(t20) are the same file and that the file B in the snapshot SnapshotTB(t21) and the file B in the snapshot SnapshotTA(t20) are the same file. Therefore, when replicating the snapshot SnapshotTB(t21) from the storage server 110 to the storage server 120, the processing circuit 111 does not need to transmit the file content data of each of the files A and B, since the processing circuit 111 knows that the file A in the snapshot SnapshotTB (t21) and the file A in the snapshot SnapshotTA(t20) are the same file and that the file B in the snapshot SnapshotTB(t21) and the file B in the snapshot SnapshotTA(t20) are the same file. The X-shape notation depicted with dashed lines may indicate that the processing circuit 111 will not treat the file A in the snapshot SnapshotTB(t21) and the file A in the snapshot SnapshotTA(t20) as different files (which may be illustrated with different types/styles of shading patterns) and will not treat the file B in the snapshot SnapshotTB(t21) and the file B in the snapshot SnapshotTA(t20) as different files (which may be illustrated with different types/styles of shading patterns), and that a full backup of each of the files A and B will not occur when replicating the snapshot SnapshotTB(t21) from the storage server 110 to the storage server 120 is performed for generating the snapshot SnapshotTB'(t21). Therefore, the present invention method (e.g. the method 300) and the associated apparatus (e.g. the storage server 110 or the processing circuit 111 therein) can prevent the related art problems.

Figure 6:
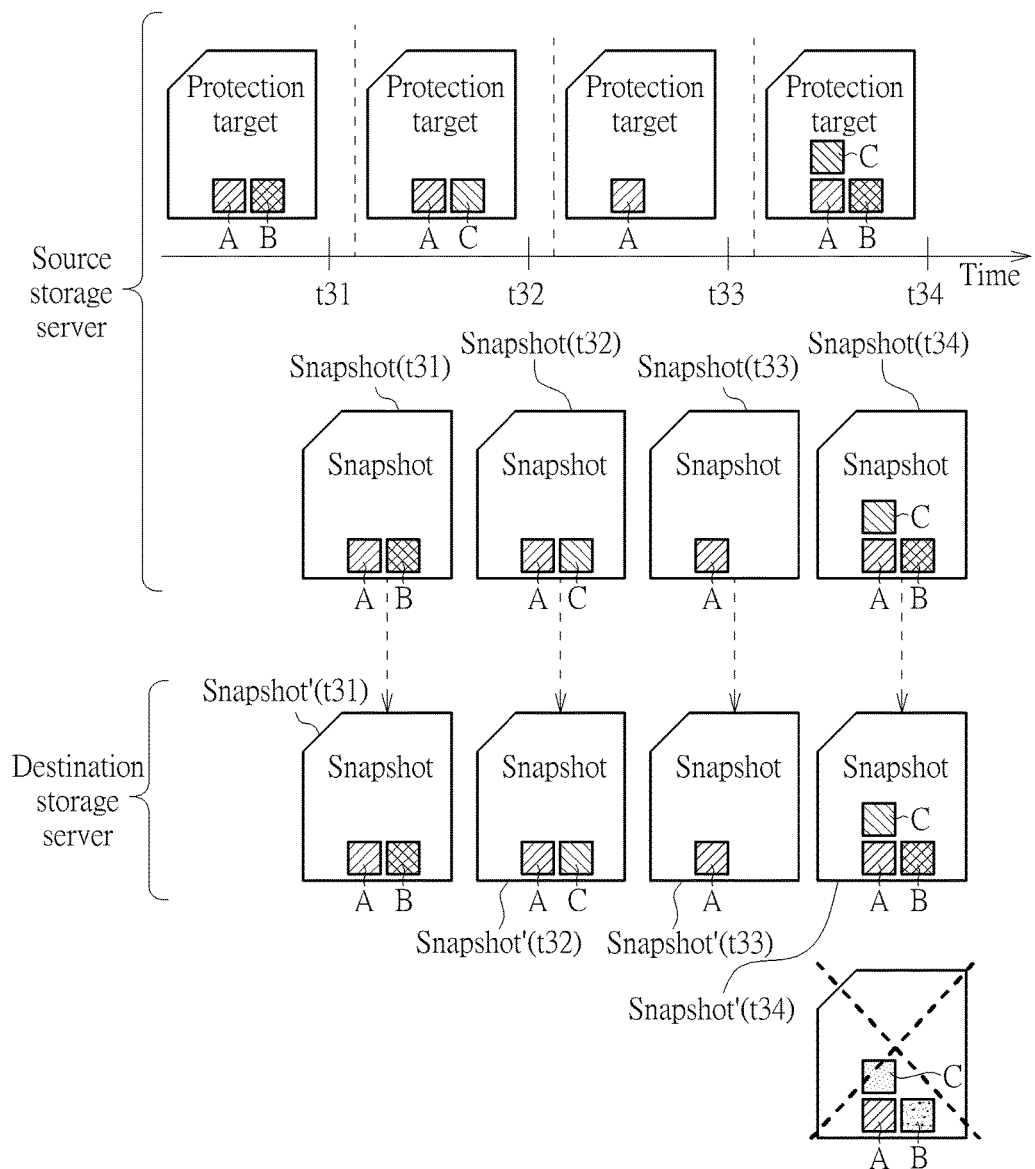
FIG. 6 illustrates some snapshots and corresponding replication versions in the storage system shown in FIG. 1 according to another embodiment of the present invention.

FIG. 6 illustrates some snapshots and corresponding replication versions in the storage system 100 shown in FIG. 1 according to another embodiment of the present invention. For example, the protection target may be a folder (e.g. a shared folder), and may originally include the files A and B therein before the time point t31. The snapshots Snapshot (t31), Snapshot(t32), Snapshot(t33), and Snapshot(t34) may be generated at the time points t31, t32, t33, and t34, respectively. As the protection target originally includes the files A and B before the time point t31, the snapshot Snapshot(t31) may also include the files A and B. At an intermediate time point in the time interval [t31, t32], the user may delete the file B and create a file C in the protection target, so the snapshot Snapshot(t32) may include the files A and C, rather than the file B. At an intermediate time point in the time interval [t32, t33], the user may delete the file C in the protection target, so the snapshot Snapshot(t33) may include the file A, rather than the file C. At an intermediate time point in the time interval [t33, t34], the user may trigger at least one operation (e.g. one or more operations, such as one or a combination of operations of restore, recovery, copy, move, etc.) to obtain the files B and C in the protection target, so the snapshot Snapshot(t34) may include the files A, B, and C.

According to the method 300, the processing circuit 111 may update the data structure of the relationship tree within the database 110D in response to operations of changing the protection target. For example, the snapshots Snapshot'(t31), Snapshot'(t32), Snapshot'(t33), and Snapshot'(t34) in the storage server 120 may be the replication versions of the snapshots Snapshot(t31), Snapshot(t32), Snapshot(t33), and Snapshot(t34) in the storage server 110, respectively. Based on the database 110D (more particularly, the data structure of the relationship tree therein), the processing circuit 111 may determine that the file B in the snapshot Snapshot(t34) and the file B in the snapshot Snapshot(t31) are the same file and that the file C in the snapshot Snapshot(t34) and the file C in the snapshot Snapshot(t32) are the same file. Therefore, when replicating the snapshot Snapshot(t34) from the storage server 110 to the storage server 120, the processing circuit 111 does not need to transmit the file content data of each of the files B and C, since the processing circuit 111 knows that the file B in the snapshot Snapshot(t34) and the file B in the snapshot Snapshot(t31) are the same file and that the file C in the snapshot Snapshot(t34) and the file C in the snapshot Snapshot(t32) are the same file. The X-shape notation depicted with dashed lines may indicate that the processing circuit 111 will not treat the file B in the snapshot Snapshot(t34) and the file B in the snapshot Snapshot(t31) as different files (which may be illustrated with different types/ styles of shading patterns) and will not treat the file C in the snapshot Snapshot(t34) and the file C in the snapshot Snapshot(t32) as different files (which may be illustrated with different types/styles of shading patterns), and that a full backup of each of the files B and C will not occur when replicating the snapshot Snapshot(t34) from the storage server 110 to the storage server 120 is performed for generating the snapshot Snapshot'(t34). Therefore, the present invention method (e.g. the method 300) and the associated apparatus (e.g. the storage server 110 or the processing circuit 111 therein) can prevent the related art problems.

According to some embodiments, the data structure of the relationship tree within the database 110D may be illustrated with one or more nodes (e.g. one or more protection target nodes, one or more snapshot nodes, and/or one or more clone point nodes). For better comprehension, in any of the embodiments respectively shown in FIGS. 7-13, the protection target node(s) may be labeled with the notation "RW" (which stands for Read/Write) and the snapshot node(s) may be labeled with the notation "RO" (which stands for Read-Only), but the present invention is not limited thereto. For example, the protection target node(s) being labeled with the notation "RW" may indicate that, when having the RW authority, the user can read and can write (e.g. change, edit, etc.) the protection target(s) corresponding to the protection target node(s). In another example, the snapshot node(s) being labeled with the notation "RO" may indicate that, when having the RO authority, the user can read the snapshot(s) corresponding to the snapshot node(s), rather than writing (e.g. changing, editing, etc.) the snapshot(s) corresponding to the snapshot node(s).

Figure 7:
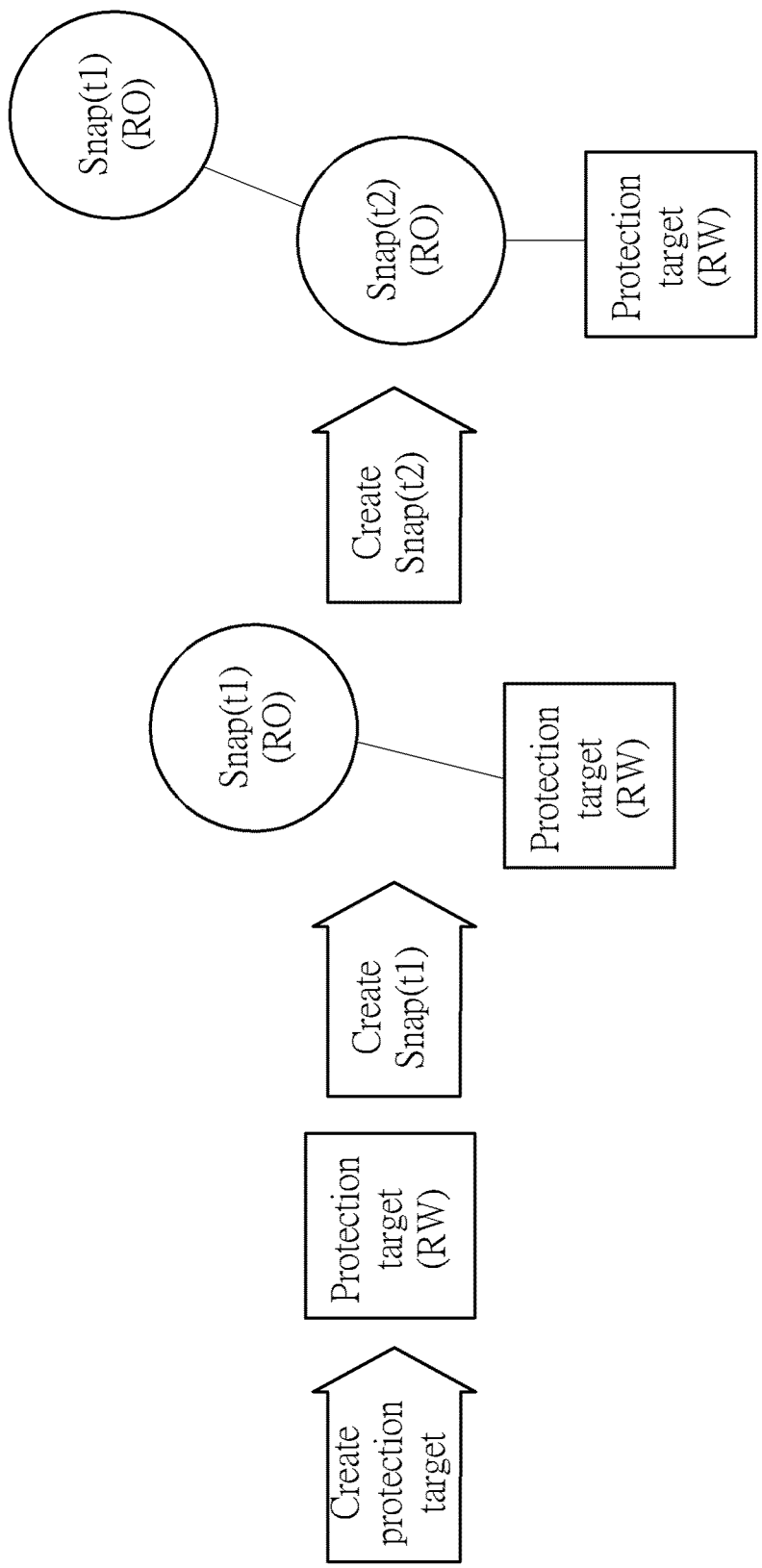
FIG. 7 illustrates transition of the data structure of the relationship tree within the database shown in FIG. 1 according to an embodiment of the present invention.

FIG. 7 illustrates transition of the data structure of the relationship tree within the database 110D shown in FIG. 1 according to an embodiment of the present invention. For example, the user may apply a setting to the storage server 110 to assign the object as the protection target (labeled "Create protection target" in FIG. 7, for better comprehension), and the processing circuit 111 may generate the protection target node (labeled "Protection target (RW)" around the left-hand side of FIG. 7) in the data structure of the relationship tree. When the replicated snapshot (e.g. a snapshot Snap(t1)) is created at the time point t1, the processing circuit 111 may add a snapshot node (labeled "Snap(t1) (RO)" around the center of FIG. 7) corresponding to the replicated snapshot above the protection target node in the data structure of the relationship tree. In addition, when the non-replicated snapshot (e.g. a snapshot Snap(t2)) is created at the time point t2, the processing circuit 111 may add a snapshot node (labeled "Snap(t2) (RO)" around the right-hand side of FIG. 7) corresponding to the non-replicated snapshot above the protection target node in the data structure of the relationship tree, to make the snapshot node corresponding to the non-replicated snapshot be inserted between the protection target node and the snapshot node corresponding to the replicated snapshot. As a result, the parent node of the protection target node is changed from the snapshot node (labeled "Snap(t1) (RO)" around the center of FIG. 7) corresponding to the replicated snapshot to the snapshot node (labeled "Snap(t2) (RO)" around the right-hand side of FIG. 7) corresponding to the non-replicated snapshot.

Figure 8:
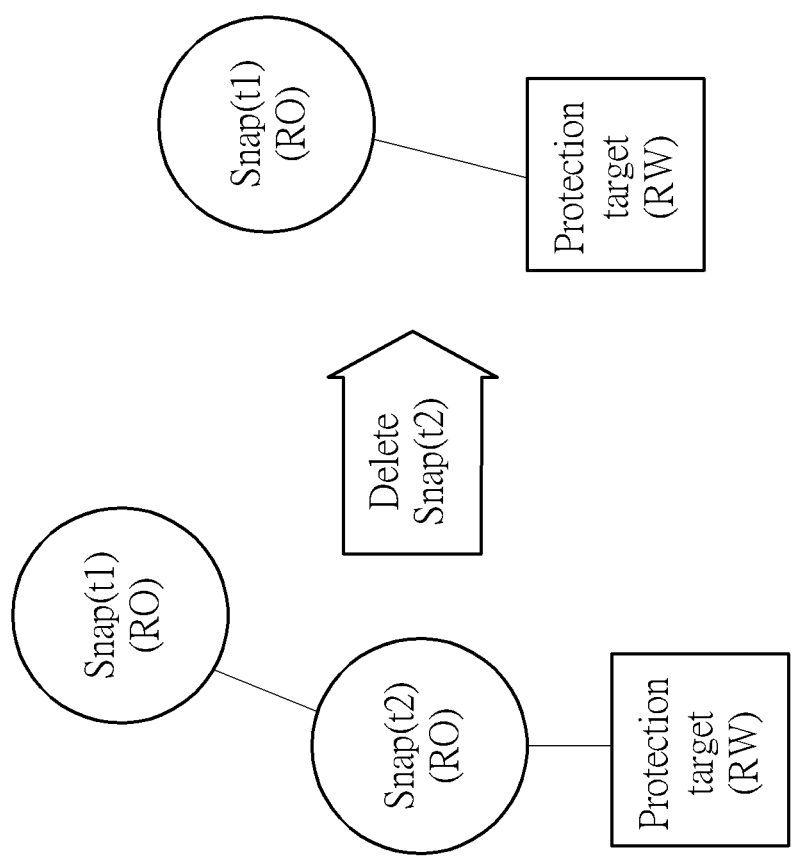
FIG. 8 illustrates transition of the data structure of the relationship tree within the database shown in FIG. 1 according to another embodiment of the present invention.

FIG. 8 illustrates transition of the data structure of the relationship tree within the database 110D shown in FIG. 1 according to another embodiment of the present invention. For example, the data structure of the relationship tree around the left-hand side of FIG. 8 may be the same as that around the right-hand side of FIG. 7. When the non-replicated snapshot (e.g. the snapshot Snap(t2)) is deleted, the processing circuit 111 may remove the snapshot node (labeled "Snap(t2) (RO)" around the left-hand side of FIG. 8) corresponding to the non-replicated snapshot from the data structure of the relationship tree to make the snapshot node (labeled "Snap(t1) (RO)" around the right-hand side of FIG. 8) corresponding to the replicated snapshot and the protection target node (labeled "Protection target (RW)" around the right-hand side of FIG. 8) be connected to each other in the data structure of the relationship tree. As a result, the parent node of the protection target node is changed from the snapshot node (labeled "Snap(t2) (RO)" around the left-hand side of FIG. 8) corresponding to the non-replicated snapshot to the snapshot node (labeled "Snap(t1) (RO)" around the right-hand side of FIG. 8) corresponding to the replicated snapshot, but the present invention is not limited thereto. According to some embodiments, when updating the data structure of the relationship tree, the processing circuit 111 may remove the node corresponding to a deleted snapshot (e.g. the snapshot Snap(t2)) to make the child node of the removed node be connected to the parent node of the removed node.

Figure 9:
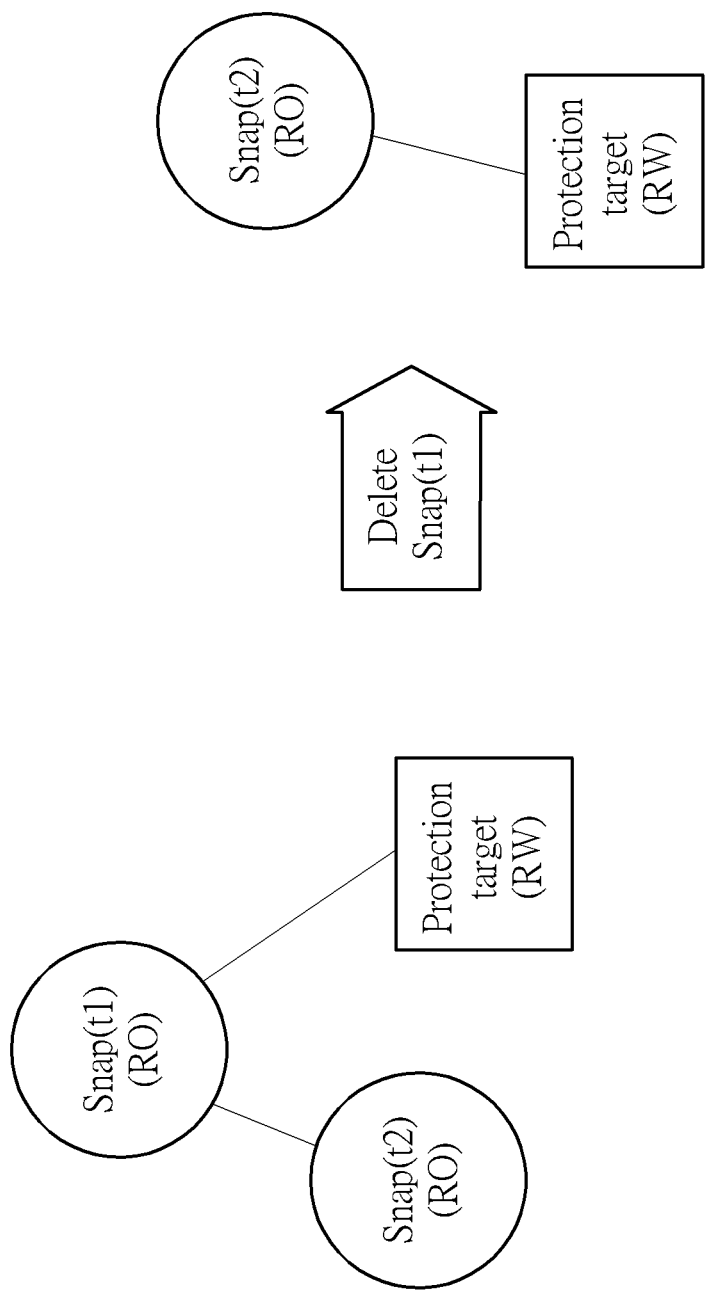
FIG. 9 illustrates transition of the data structure of the relationship tree within the database shown in FIG. 1 according to another embodiment of the present invention.

FIG. 9 illustrates transition of the data structure of the relationship tree within the database 110D shown in FIG. 1 according to another embodiment of the present invention. For example, the user may trigger an operation such as a restore operation, and, in response to the triggered operation, the processing circuit 111 may update the data structure of the relationship tree to make it become that shown around the left-hand side of FIG. 9. When the replicated snapshot (e.g. the snapshot Snap(t1)) is deleted, the processing circuit 111 may remove the snapshot node (labeled "Snap(t1) (RO)" around the left-hand side of FIG. 9) corresponding to the replicated snapshot and move the snapshot node (labeled "Snap(t2) (RO)" around the left-hand side of FIG. 9) corresponding to the non-replicated snapshot upward to replace the snapshot node corresponding to the replicated snapshot in the data structure of the relationship tree. As a result, the parent node of the protection target node is changed from the snapshot node (labeled "Snap(t1) (RO)" around the left-hand side of FIG. 9) corresponding to the replicated snapshot to the snapshot node (labeled "Snap(t2) (RO)" around the right-hand side of FIG. 9) corresponding to the non-replicated snapshot, but the present invention is not limited thereto. According to some embodiments, when updating the data structure of the relationship tree, the processing circuit 111 may remove the node corresponding to a deleted snapshot (e.g. the snapshot Snap(t1)) to make a child node (e.g. the node corresponding to the snapshot Snap(t2)) of the removed node replace the removed node.

Figure 10:
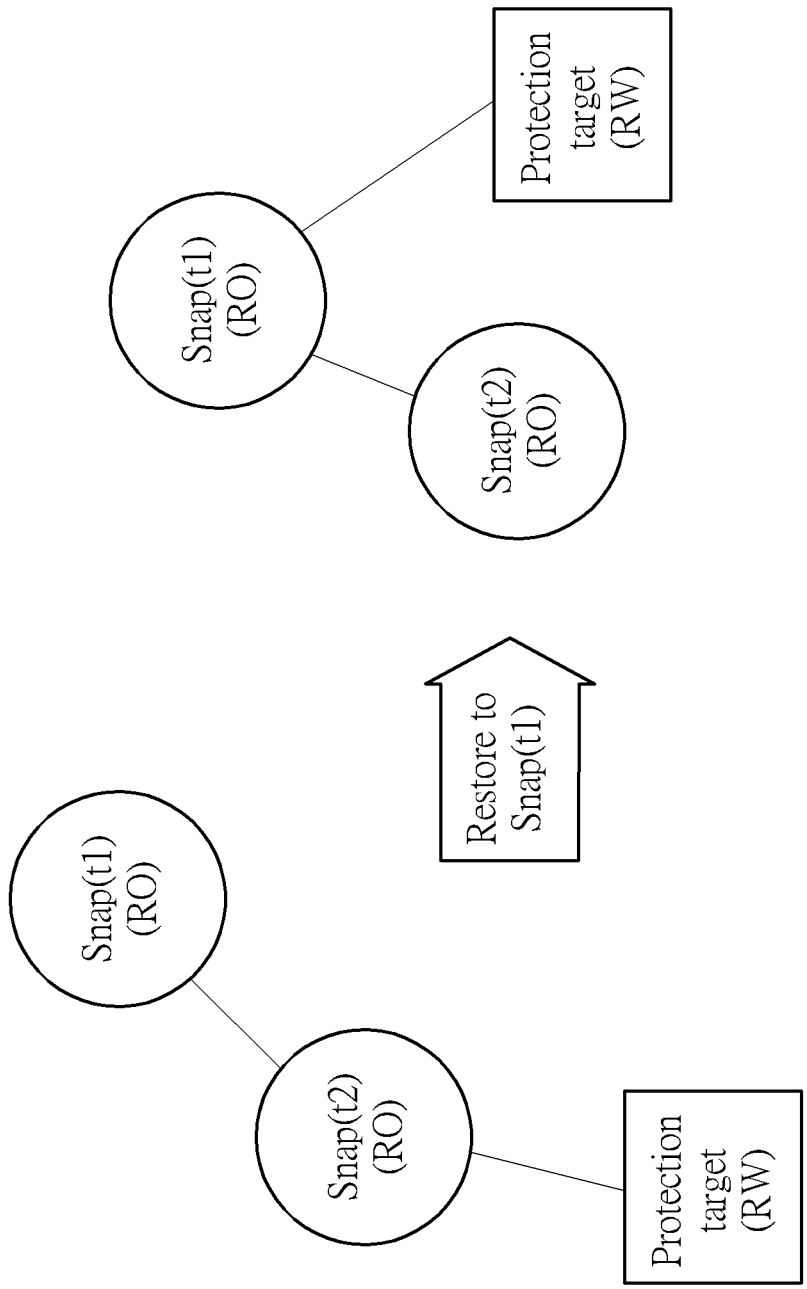
FIG. 10 illustrates transition of the data structure of the relationship tree within the database shown in FIG. 1 according to another embodiment of the present invention.

FIG. 10 illustrates transition of the data structure of the relationship tree within the database 110D shown in FIG. 1 according to another embodiment of the present invention. For example, the data structure of the relationship tree around the left-hand side of FIG. 10 may be the same as that around the right-hand side of FIG. 7. When an operation of restoring to the replicated snapshot (e.g. the snapshot Snap(t1)) is performed in the storage server 110, the processing circuit 111 may move the protection target node (labeled "Protection target (RW)" around the left-hand side of FIG. 10) upward to make the protection target node (labeled "Protection target (RW)" around the right-hand side of FIG. 10) and the snapshot node (labeled "Snap(t1) (RO)" around the right-hand side of FIG. 10) corresponding to the replicated snapshot be connected to each other in the data structure of the relationship tree. As a result, the parent node of the protection target node is changed from the snapshot node (labeled "Snap(t2) (RO)" around the left-hand side of FIG. 10) corresponding to the non-replicated snapshot to the snapshot node (labeled "Snap(t1) (RO)" around the right-hand side of FIG. 10) corresponding to the replicated snapshot, but the present invention is not limited thereto. According to some embodiments, when updating the data structure of the relationship tree in response to the aforementioned operation of restoring to the replicated snapshot (e.g. the snapshot Snap(t1)), the processing circuit 111 may move the protection target node (labeled "Protection target (RW)" around the left-hand side of FIG. 10) to make it become a child node of the snapshot node (labeled "Snap(t1) (RO)" around the right-hand side of FIG. 10) corresponding to the replicated snapshot.

According to some embodiments, the aforementioned operation of restoring to the replicated snapshot (e.g. the snapshot Snap(t1)) may be the restore operation mentioned in the embodiment shown in FIG. 9. In addition, the processing circuit 111 may perform the associated operations of the embodiment shown in FIG. 9. For brevity, similar descriptions for these embodiments are not repeated in detail here.

Figure 11:
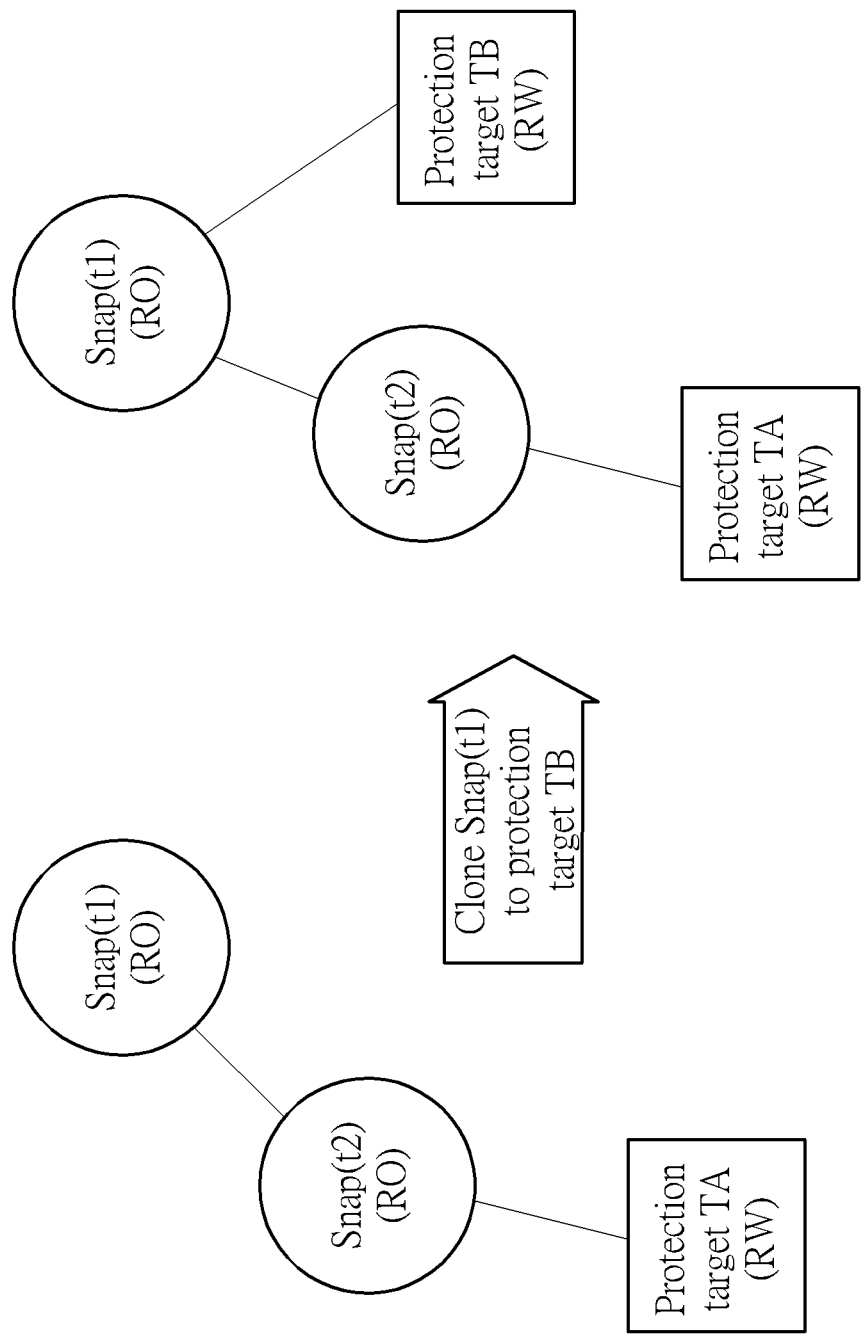
FIG. 11 illustrates transition of the data structure of the relationship tree within the database shown in FIG. 1 according to another embodiment of the present invention.

FIG. 11 illustrates transition of the data structure of the relationship tree within the database 110D shown in FIG. 1 according to another embodiment of the present invention. According to this embodiment, the protection target mentioned in Step 310 may be the protection target TA. The node labeled "Protection target TA (RW)" around the left-hand side of FIG. 11 may be taken as an example of the protection target node, and the node labeled "Protection target TB (RW)" around the right-hand side of FIG. 11 may be taken as an example of the other protection target node. In addition, the data structure of the relationship tree around the left-hand side of FIG. 11 may be the same as that around the right-hand side of FIG. 7. When a cloning operation triggered by the user of the storage server 110 is performed to clone the replicated snapshot (e.g. the snapshot Snap(t1)) to create the other protection target such as the protection target TB in the storage server 110, the processing circuit 111 may add the other protection target node (labeled "Protection target TB (RW)" around the right-hand side of FIG. 11) below the snapshot node (labeled "Snap(t1) (RO)" around the right-hand side of FIG. 11) corresponding to the replicated snapshot in the data structure of the relationship tree. As a result, the other protection target node becomes a child node of the snapshot node (labeled "Snap(t1) (RO)" around the right-hand side of FIG. 11) corresponding to the replicated snapshot.

Figure 12:
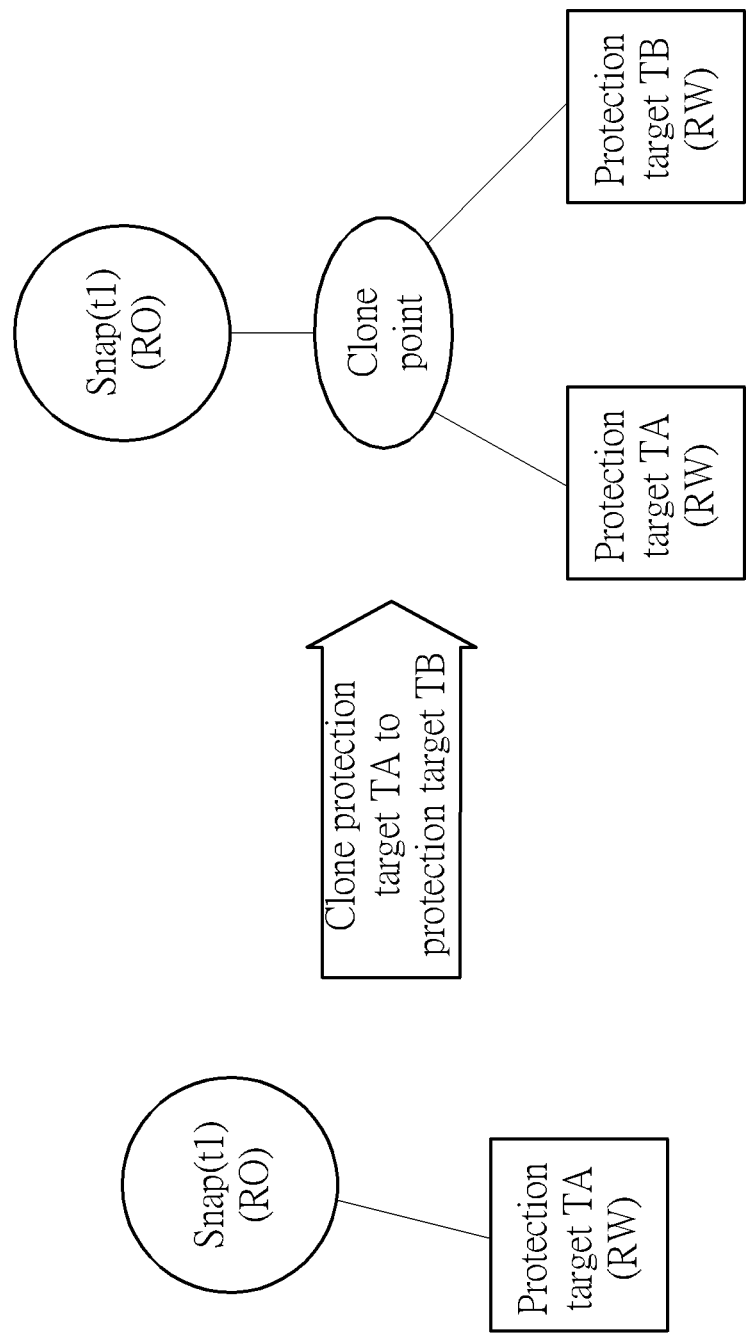
FIG. 12 illustrates transition of the data structure of the relationship tree within the database shown in FIG. 1 according to another embodiment of the present invention.

FIG. 12 illustrates transition of the data structure of the relationship tree within the database 110D shown in FIG. 1 according to another embodiment of the present invention. According to this embodiment, the protection target mentioned in Step 310 may be the protection target TA. The node labeled "Protection target TA (RW)" around the left-hand side of FIG. 12 may be taken as an example of the protection target node, and the node labeled "Protection target TB (RW)" around the right-hand side of FIG. 12 may be taken as an example of the other protection target node. In addition, the data structure of the relationship tree around the left-hand side of FIG. 12 may be the same as that around the right-hand side of FIG. 8. When a cloning operation triggered by the user of the storage server 110 is performed to clone the protection target TA to create the other protection target such as the protection target TB in the storage server 110, the processing circuit 111 may insert a clone point node (labeled "Clone point" in FIG. 12, since the clone point node may be simply referred to as the clone point) between the protection target node (labeled "Protection target TA (RW)") and the parent node of the protection target node (e.g. the node labeled "Snap(t1) (RO)" is originally the parent node of the node labeled "Protection target TA (RW)" as shown in the left-hand side of FIG. 12) and add the other protection target node (labeled "Protection target TB (RW)" around the right-hand side of FIG. 12) below the clone point node in the data structure of the relationship tree.

In this embodiment, the data structure of the relationship tree may include the clone point node, and the clone point node may be a node inserted into the data structure of the relationship tree to indicate the cloning operation triggered by the user of the storage server 110. In addition, the other protection target node (labeled "Protection target TB (RW)" around the right-hand side of FIG. 12) may correspond to the other protection target such as the protection target TB, and both of the protection target node (labeled "Protection target TA (RW)" around the right-hand side of FIG. 12) and the other protection target node (labeled "Protection target TB (RW)" around the right-hand side of FIG. 12) may become child nodes of the clone point node.

According to some embodiments (e.g. any of the embodiments respectively shown in FIG. 11 and FIG. 12), the processing circuit 111 may record at least one relationship between the other protection target (e.g. the protection target TB) in the storage server 110 and at least one portion (e.g. a portion or all) of the plurality of snapshots in the database 110D, and may update the data structure of the relationship tree within the database 110D during recording the aforementioned at least one relationship. As a result, the data structure of the relationship tree may include the other protection target node (e.g. the node labeled "Protection target TB (RW)" around the right-hand side of any of FIGS. 11-12) to indicate the other protection target (e.g. the protection target TB).

Figure 13:
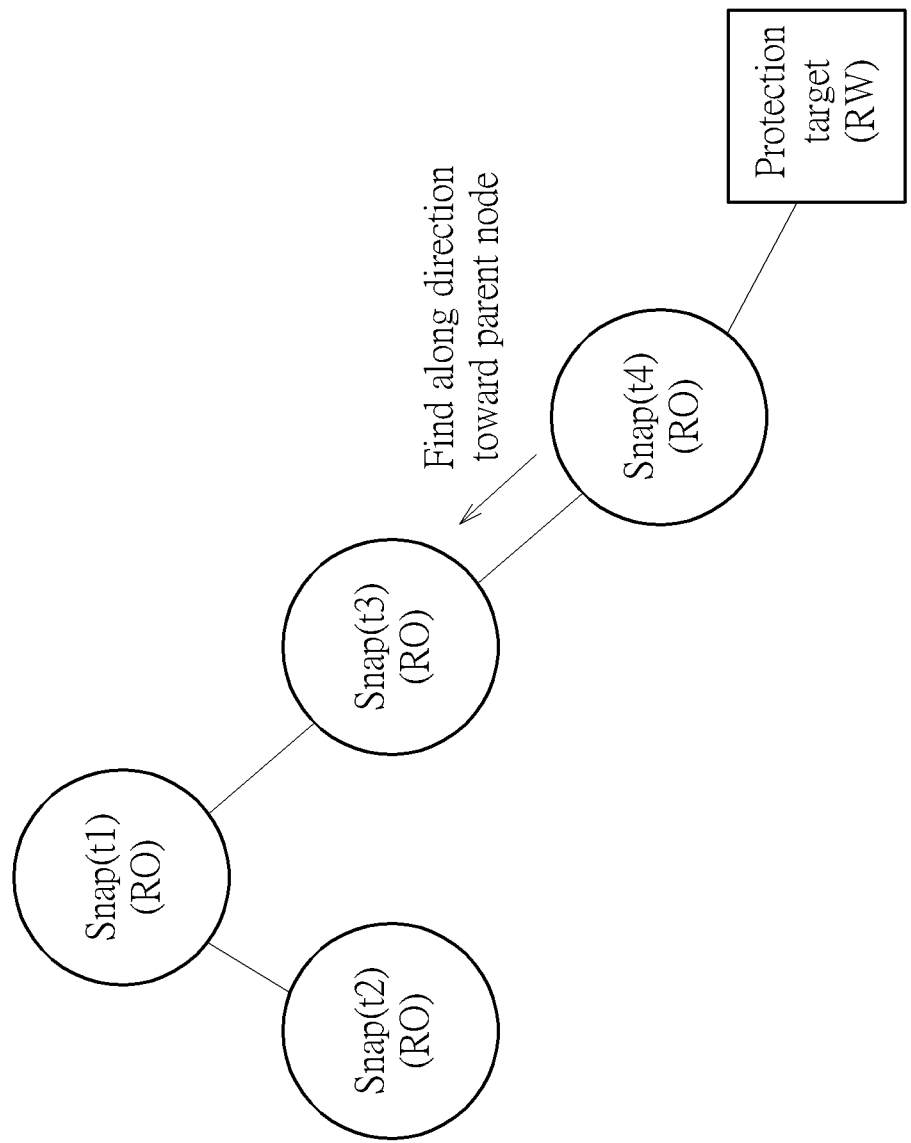
FIG. 13 illustrates a reference selection control scheme of the method shown in FIG. 3 according to an embodiment of the present invention.

FIG. 13 illustrates a reference selection control scheme of the method 300 shown in FIG. 3 according to an embodiment of the present invention. In addition to the snapshots Snap(t1) and Snap(t2), the processing circuit 111 may generate some additional snapshots Snap(t3) and Snap(t4) of the protection target in the storage server 110, and the snapshots Snap(t3) and Snap(t4) may be generated at time points t3 and t4, respectively, where t1<t2<t3<t4. For example, after some operations performed in the storage server 110, the processing circuit 111 may update the data structure of the relationship tree to make it become that shown in FIG. 13. The nodes respectively labeled "Snap(t1) (RO)", "Snap(t2) (RO)", "Snap(t3) (RO)", and "Snap(t4) (RO)" in the data structure of the relationship tree correspond to the snapshots Snap(t1), Snap(t2), Snap(t3), and Snap(t4) of the protection target, respectively. The snapshot Snap(t4) may be taken as an example of the latest non-replicated snapshot mentioned above at a specific time point after the time point t4. During determining the reference of replication difference calculation for the non-replicated snapshot (e.g. the latest non-replicated snapshot such as the snapshot Snap(t4)), the processing circuit 111 may search for at least one closest snapshot node (e.g. one or more closest snapshot nodes) along the direction toward the root (or the root node) in the data structure of the relationship tree. The aforementioned at least one closest snapshot node may include at least one node (e.g. one or more nodes) that is closest to the snapshot node corresponding to the non-replicated snapshot (e.g. the latest non-replicated snapshot such as the snapshot Snap(t4)) in the data structure of the relationship tree, and the reference of replication difference calculation may include at least one snapshot corresponding to the aforementioned at least one closest snapshot node. For the snapshot node corresponding to the snapshot Snap(t4), the direction toward the root (or the root node) is the same as the direction toward its parent node such as the snapshot node corresponding to the snapshot Snap(t3) (e.g. the upward direction), and the processing circuit 111 may find the aforementioned at least one closest snapshot node along the direction toward the parent node. As a result, the aforementioned at least one closest snapshot node may include the parent node such as the snapshot node corresponding to the snapshot Snap(t3), but the present invention is not limited thereto. According to some embodiments, the number of snapshot nodes within the aforementioned at least one closest snapshot node may be greater than one, and, in addition to the parent node such as the snapshot node corresponding to the snapshot Snap (t3), the aforementioned at least one closest snapshot node may further include one or more other snapshot nodes searchable in the data structure of the relationship tree (e.g. the snapshot node corresponding to the snapshot Snap(t1), the snapshot node corresponding to the snapshot Snap(t2), etc.), no matter whether one or more clone point nodes exist or not.

Figure 14:
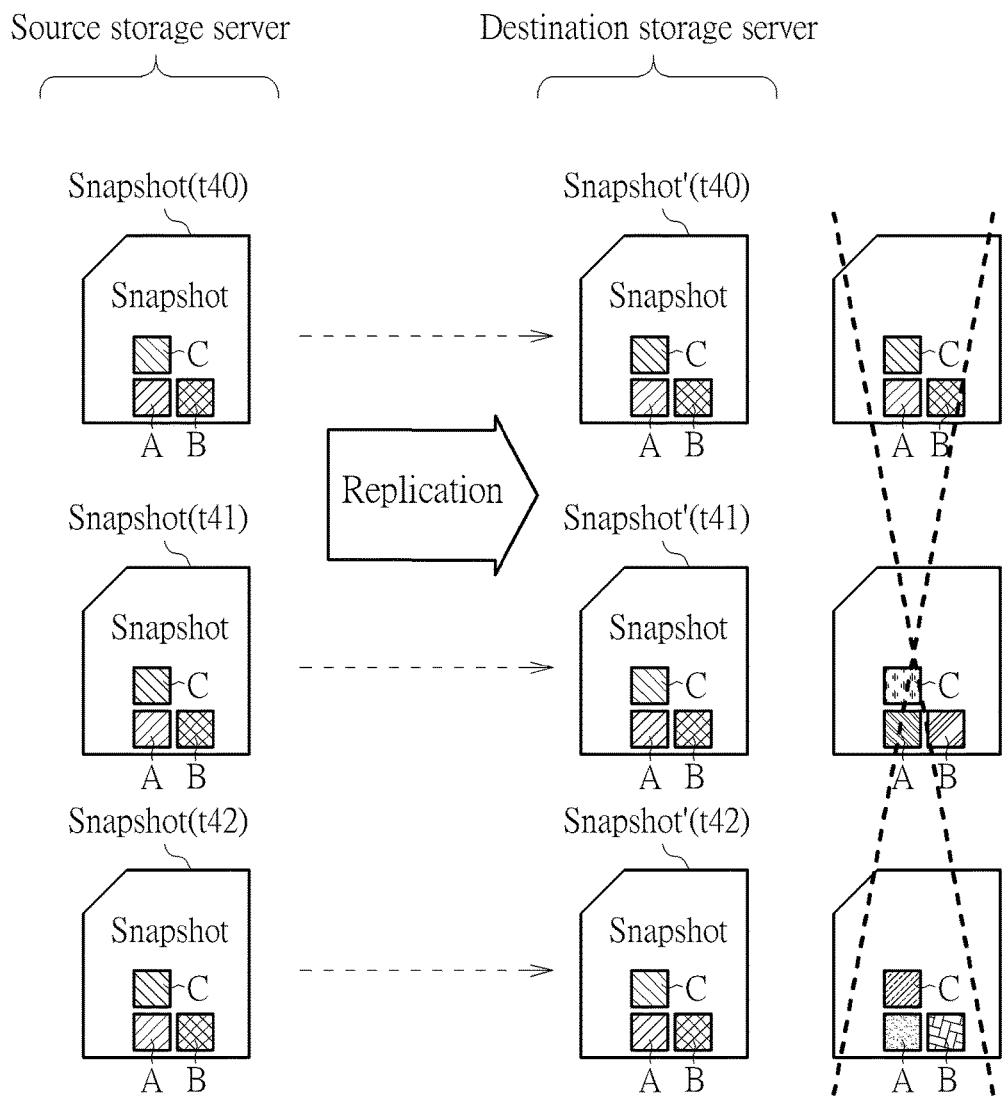
FIG. 14 illustrates some snapshots and corresponding replication versions in the storage system shown in FIG. 1 according to another embodiment of the present invention.

FIG. 14 illustrates some snapshots and corresponding replication versions in the storage system 100 shown in FIG. 1 according to another embodiment of the present invention. For example, the protection target TA may be a folder (e.g. a shared folder), and may originally include the files A, B, and C therein before the time point t40. The user may trigger some cloning operations to clone the protection target TA to create some other protection targets such as the protection targets TB and TC in the storage server 110. The snapshot SnapshotTA(t40) of the protection target TA, the snapshot SnapshotTB(t41) of the protection target TB, and the snapshot SnapshotTC(t42) of the protection target TC may be generated at the time points t40, t41, and t42, respectively, where t40<t41<t42. As the protection target TA originally includes the files A, B, and C before the time point t40, the snapshot SnapshotTA(t40) may also include the files A, B, and C. As a result of the cloning operations, each of the snapshots SnapshotTB(t41) and SnapshotTC(t42) may also include the files A, B, and C.

According to the method 300, the processing circuit 111 may update the data structure of the relationship tree within the database 110D in response to the cloning operations. For example, after some replication operations are performed (labeled "Replication" in FIG. 14, for brevity), the snapshots SnapshotTA'(t40), SnapshotTB'(t41), and SnapshotTC'(t42) are generated in the storage server 120, in which the snapshots SnapshotTA'(t40), SnapshotTB'(t41), and SnapshotTC'(t42) may be the replication versions of the snapshots SnapshotTA(t40), SnapshotTB(t41), and SnapshotTC (t42) in the storage server 110, respectively. Based on the database 110D (more particularly, the data structure of the relationship tree therein), the processing circuit 111 may determine that the file A in any of the snapshots SnapshotTB (t41) and SnapshotTC(t42) and the file A in the snapshot SnapshotTA(t40) are the same file and that the file B in any of the snapshots SnapshotTB(t41) and SnapshotTC(t42) and the file B in the snapshot SnapshotTA(t40) are the same file and that the file C in any of the snapshots SnapshotTB(t41) and SnapshotTC(t42) and the file C in the snapshot SnapshotTA(t40) are the same file. Therefore, when replicating the snapshots SnapshotTB(t41) and SnapshotTC(t42) from the storage server 110 to the storage server 120, the processing circuit 111 does not need to transmit the file content data of each of the files A, B, and C, since the processing circuit 111 knows that the file A in any of the snapshots SnapshotTB(t41) and SnapshotTC (t42) and the file A in the snapshot SnapshotTA(t40) are the same file and that the file B in any of the snapshots SnapshotTB(t41) and SnapshotTC (t42) and the file B in the snapshot SnapshotTA(t40) are the same file and that the file C in any of the snapshots SnapshotTB (t41) and SnapshotTC(t42) and the file C in the snapshot SnapshotTA(t40) are the same file. The X-shape notation depicted with dashed lines may indicate that the processing circuit 111 will not treat the file A in any of the snapshots SnapshotTB(t41) and SnapshotTC(t42) and the file A in the snapshot SnapshotTA(t40) as different files (which may be illustrated with different types/styles of shading patterns) and will not treat the file B in any of the snapshots SnapshotTB(t41) and SnapshotTC(t42) and the file B in the snapshot SnapshotTA(t40) as different files (which may be illustrated with different types/styles of shading patterns) and will not treat the file C in any of the snapshots SnapshotTB(t41) and SnapshotTC (t42) and the file C in the snapshot SnapshotTA(t40) as different files (which may be illustrated with different types/styles of shading patterns), and that a full backup of each of the files A, B, and C will not occur when the operations of replicating the snapshots SnapshotTB(t41) and SnapshotTC(t42) from the storage server 110 to the storage server 120 are performed for generating the snapshots SnapshotTB'(t21) and SnapshotTC'(t42), respectively. Therefore, the present invention method (e.g. the method 300) and the associated apparatus (e.g. the storage server 110 or the processing circuit 111 therein) can prevent the related art problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing replication control in a storage system, the storage system comprising a first storage server and a second storage server, the method comprising:
  recording relationships between a protection target in the first storage server and a plurality of snapshots of the protection target in a database of the first storage server and updating the database during recording the relationships, wherein the database comprises a relationship tree, and data structure of the relationship tree comprises snapshot nodes respectively corresponding to the plurality of snapshots and a protection target node corresponding to the protection target;
  selecting a non-replicated snapshot that has not been replicated from the first storage server to the second storage server, wherein the plurality of snapshots comprises the non-replicated snapshot, and the non-replicated snapshot is created in the first storage server at a first time point;
  selecting a replicated snapshot that has been replicated from the first storage server to the second storage server as reference of replication difference calculation according to the relationship tree within the database, wherein the plurality of snapshots comprises the replicated snapshot, and the replicated snapshot is created in the first storage server at a second time point prior to the first time point;
  generating snapshot difference data between the non-replicated snapshot and the replicated snapshot, wherein the snapshot difference data indicate any difference between the non-replicated snapshot and the replicated snapshot; and transmitting the snapshot difference data from the first storage server to the second storage server, to replicate the non-replicated snapshot from the first storage server to the second storage server;

wherein the step of recording the relationships between the protection target in the first storage server and the plurality of snapshots of the protection target in the database of the first storage server and updating the database during recording the relationships further comprises:

adding a snapshot node corresponding to the replicated snapshot above the protection target node in the data structure of the relationship tree when the replicated snapshot is created; and adding a snapshot node corresponding to the non-replicated snapshot above the protection target node in the data structure of the relationship tree when the non-replicated snapshot is created, wherein a parent node of the protection target node is changed from the snapshot node corresponding to the replicated snapshot to the snapshot node corresponding to the non-replicated snapshot.

2. The method of claim 1, wherein the step of updating the database during recording the relationships further comprises:

updating the data structure of the relationship tree within the database during recording the relationships.

3. The method of claim 1, further comprising:

monitoring at least one user behavior of a user of the first storage server to update the data structure of the relationship tree according to the at least one user behavior.

4. The method of claim 1, wherein the protection target node is a leaf node.

5. The method of claim 1, wherein the data structure of the relationship tree further comprises a clone point node; and the clone point node is a node inserted into the data structure of the relationship tree to indicate a cloning operation triggered by a user of the first storage server.

6. The method of claim 1, wherein the data structure of the relationship tree further comprises another protection target node, and the other protection target node indicates another protection target that is generated by performing a cloning operation in the first storage server.

7. The method of claim 1, further comprising:

when the non-replicated snapshot is deleted, removing the snapshot node corresponding to the non-replicated snapshot from the data structure of the relationship tree to make the snapshot node corresponding to the replicated snapshot and the protection target node be connected to each other in the data structure of the relationship tree, wherein the parent node of the protection target node is changed from the snapshot node corresponding to the non-replicated snapshot to the snapshot node corresponding to the replicated snapshot.

8. The method of claim 1, further comprising:

when the replicated snapshot is deleted, removing the snapshot node corresponding to the replicated snapshot and moving the snapshot node corresponding to the non-replicated snapshot upward to replace the snapshot node corresponding to the replicated snapshot in the data structure of the relationship tree, wherein the parent node of the protection target node is changed from the snapshot node corresponding to the replicated snapshot to the snapshot node corresponding to the non-replicated snapshot.

9. The method of claim 1, further comprising:

when an operation of restoring to the replicated snapshot is performed in the first storage server, moving the protection target node upward to make the protection target node and the snapshot node corresponding to the replicated snapshot be connected to each other in the data structure of the relationship tree, wherein the parent node of the protection target node is changed from the snapshot node corresponding to the non-replicated snapshot to the snapshot node corresponding to the replicated snapshot.

10. The method of claim 9, further comprising:

when the replicated snapshot is deleted, removing the snapshot node corresponding to the replicated snapshot and moving the snapshot node corresponding to the non-replicated snapshot upward to replace the snapshot node corresponding to the replicated snapshot in the data structure of the relationship tree, wherein the parent node of the protection target node is changed from the snapshot node corresponding to the replicated snapshot to the snapshot node corresponding to the non-replicated snapshot.

11. The method of claim 1, further comprising:

when a cloning operation triggered by a user of the first storage server is performed to clone the replicated snapshot to create another protection target in the first storage server, adding another protection target node below the snapshot node corresponding to the replicated snapshot in the data structure of the relationship tree, wherein the other protection target node becomes a child node of the snapshot node corresponding to the replicated snapshot.

12. The method of claim 1, further comprising:

when a cloning operation triggered by a user of the first storage server is performed to clone the protection target to create another protection target in the first storage server, inserting a clone point node between the protection target node and the parent node of the protection target node and adding another protection target node below the clone point node in the data structure of the relationship tree, wherein the clone point node indicates the cloning operation triggered by the user of the first storage server, the other protection target node corresponds to the other protection target, and both of the protection target node and the other protection target node become child nodes of the clone point node.

13. The method of claim 1, further comprising:

recording at least one relationship between another protection target in the first storage server and at least one portion of the plurality of snapshots in the database, wherein the data structure of the relationship tree comprises another protection target node to indicate the other protection target.

14. The method of claim 1, further comprising:

during determining the reference of replication difference calculation for the non-replicated snapshot, searching for at least one closest snapshot node along a direction toward a root in the data structure of the relationship tree, wherein the at least one closest snapshot node comprises at least one node that is closest to the snapshot node corresponding to the non-replicated snapshot in the data structure of the relationship tree, and the reference of replication difference calculation comprises at least one snapshot corresponding to the at least one closest snapshot node.

15. An apparatus for performing replication control in a storage system, the storage system comprising a first storage server and a second storage server, the apparatus comprising:

a processing circuit, positioned in the first storage server, arranged to control operations of the first storage server, wherein controlling the operations of the first storage server comprises:

recording relationships between a protection target in the first storage server and a plurality of snapshots of the protection target in a database of the first storage server and updating the database during recording the relationships, wherein the database comprises a relationship tree, and data structure of the relationship tree comprises snapshot nodes respectively corresponding to the plurality of snapshots and a protection target node corresponding to the protection target;

selecting a non-replicated snapshot that has not been replicated from the first storage server to the second storage server, wherein the plurality of snapshots comprises the non-replicated snapshot, and the non-replicated snapshot is created in the first storage server at a first time point;

selecting a replicated snapshot that has been replicated from the first storage server to the second storage server as reference of replication difference calculation according to the relationship tree within the database, wherein the plurality of snapshots comprises the replicated snapshot, and the replicated snapshot is created in the first storage server at a second time point prior to the first time point;

generating snapshot difference data between the non-replicated snapshot and the replicated snapshot, wherein the snapshot difference data indicate any difference between the non-replicated snapshot and the replicated snapshot; and transmitting the snapshot difference data from the first storage server to the second storage server, to replicate the non-replicated snapshot from the first storage server to the second storage server;

wherein the step of recording the relationships between the protection target in the first storage server and the plurality of snapshots of the protection target in the database of the first storage server and updating the database during recording the relationships further comprises:

adding a snapshot node corresponding to the replicated snapshot above the protection target node in the data structure of the relationship tree when the replicated snapshot is created; and adding a snapshot node corresponding to the non-replicated snapshot above the protection target node in the data structure of the relationship tree when the non-replicated snapshot is created, wherein a parent node of the protection target node is changed from the snapshot node corresponding to the replicated snapshot to the snapshot node corresponding to the non-replicated snapshot.

16. The apparatus of claim 15, wherein the processing circuit updates the data structure of the relationship tree within the database during recording the relationships.

17. The apparatus of claim 15, wherein the processing circuit monitors at least one user behavior of a user of the first storage server to update the data structure of the relationship tree according to the at least one user behavior.

18. The apparatus of claim 15, wherein the protection target node is a leaf node.

19. The apparatus of claim 15, wherein the data structure of the relationship tree further comprises a clone point node, and the clone point node indicates a clone point regarding a cloning operation triggered by a user of the first storage server.

* * * * *